(12) United States Patent
Nakatsu et al.

(10) Patent No.: US 7,410,059 B2
(45) Date of Patent: Aug. 12, 2008

(54) COMMODITY PACKAGING BODY

(75) Inventors: Kenichi Nakatsu, Higashiosaka (JP); Noriko Himeda, Osaka (JP); Futoshi Tada, Osaka (JP); Jiro Okamoto, Osaka (JP); Naoko Maeda, Osaka (JP); Yuka Shimizu, Osaka (JP); Masaya Fujimura, Sakai (JP); Shinsuke Tanioku, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 504 days.

(21) Appl. No.: 10/505,172

(22) PCT Filed: Sep. 11, 2003

(86) PCT No.: PCT/JP03/11671

§ 371 (c)(1),
(2), (4) Date: Aug. 31, 2004

(87) PCT Pub. No.: WO2004/024589

PCT Pub. Date: Mar. 25, 2004

(65) Prior Publication Data

US 2005/0103680 A1 May 19, 2005

(30) Foreign Application Priority Data

| Sep. 11, 2002 | (JP) | ............................. 2002-264907 |
| Sep. 11, 2002 | (JP) | ............................. 2002-264908 |
| Sep. 11, 2002 | (JP) | ............................. 2002-264911 |
| Dec. 4, 2002 | (JP) | ............................. 2002-352461 |

(51) Int. Cl.
- *B65D 85/88* (2006.01)
- *B65D 85/30* (2006.01)
- *B65D 73/02* (2006.01)

(52) U.S. Cl. ...................................... 206/704; 206/471
(58) Field of Classification Search ................. 206/703, 206/705, 461, 462, 463, 471, 470, 469, 472, 206/531, 532, 538, 70; 429/48
See application file for complete search history.

(56) References Cited

U.S. PATENT DOCUMENTS 4,693,371 A * 9/1987 Malpass ...................... 206/538

(Continued)

FOREIGN PATENT DOCUMENTS

JP 58-37833 8/1983

(Continued)

OTHER PUBLICATIONS

Partial English Language translation of JP 58-37833.

(Continued)

*Primary Examiner*—Mickey Yu
*Assistant Examiner*—Steven A. Reynolds
(74) *Attorney, Agent, or Firm*—Greenblum & Bernstein, P.L.C.

(57) ABSTRACT

An article packaging body including an article containing plate which has a plurality of recesses configured to receive articles. A cover plate connected to the article containing plate, and a gripping plate extending from either one of the article containing plate and the cover plate. Additionally, the gripping plate may be provided with a plurality of grips configured to hold corresponding articles at a distal end, the grips configured to be individually separable from each other. Further, the gripping plate is configured to be folded onto the article containing plate such that the articles are received in corresponding recesses.

34 Claims, 14 Drawing Sheets

U.S. PATENT DOCUMENTS

| | | | |
|---|---|---|---|
| 4,860,890 A * | 8/1989 | Cerny et al. | 206/704 |
| 6,329,095 B1 | 12/2001 | Farnworth et al. | |
| 6,364,115 B1 * | 4/2002 | Casanova et al. | 206/471 |
| 2003/0173709 A1 | 9/2003 | Iwaizono et al. | |

FOREIGN PATENT DOCUMENTS

| | | |
|---|---|---|
| JP | 3061986 | 6/1999 |

OTHER PUBLICATIONS

Partial English Language translation of JP 3061986.

* cited by examiner

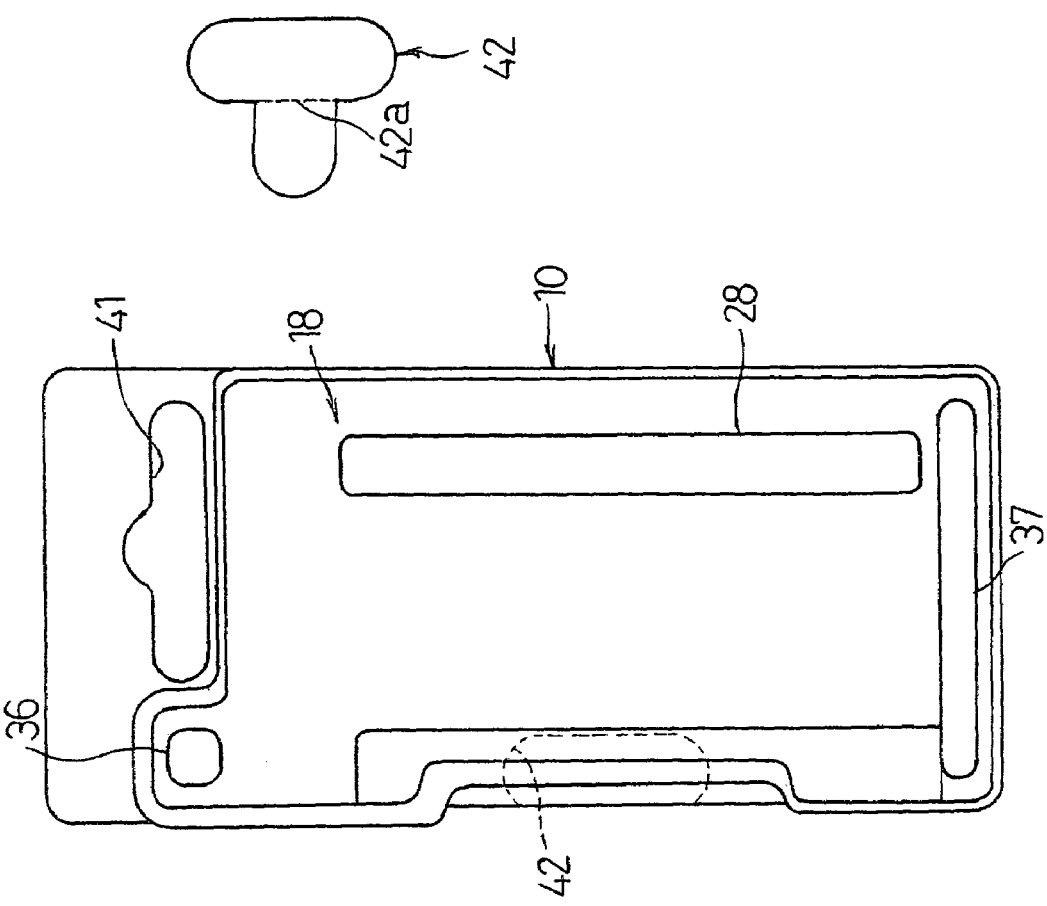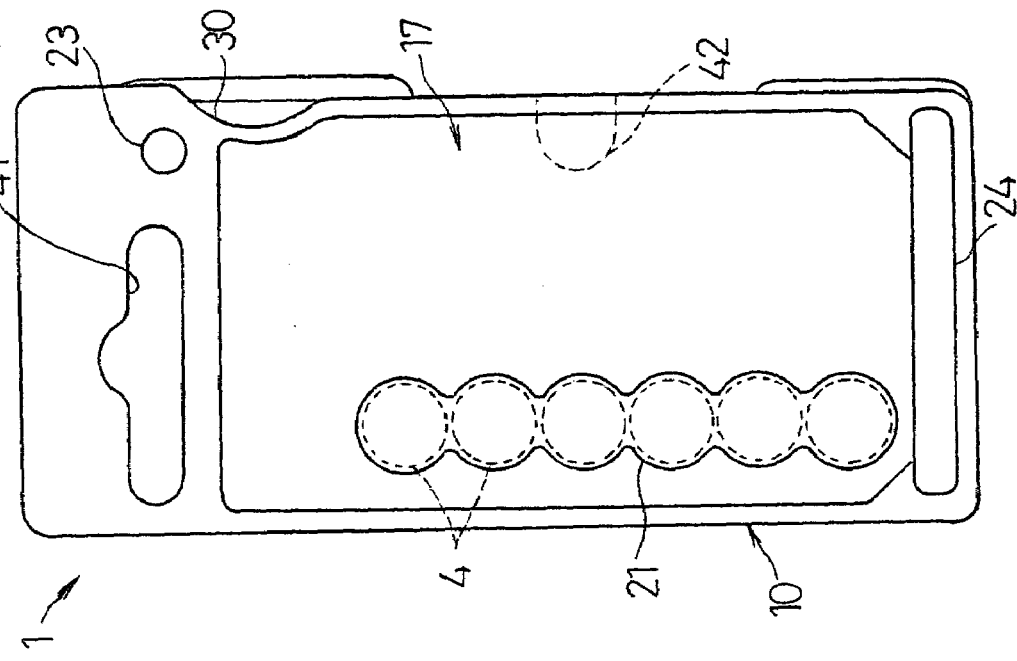

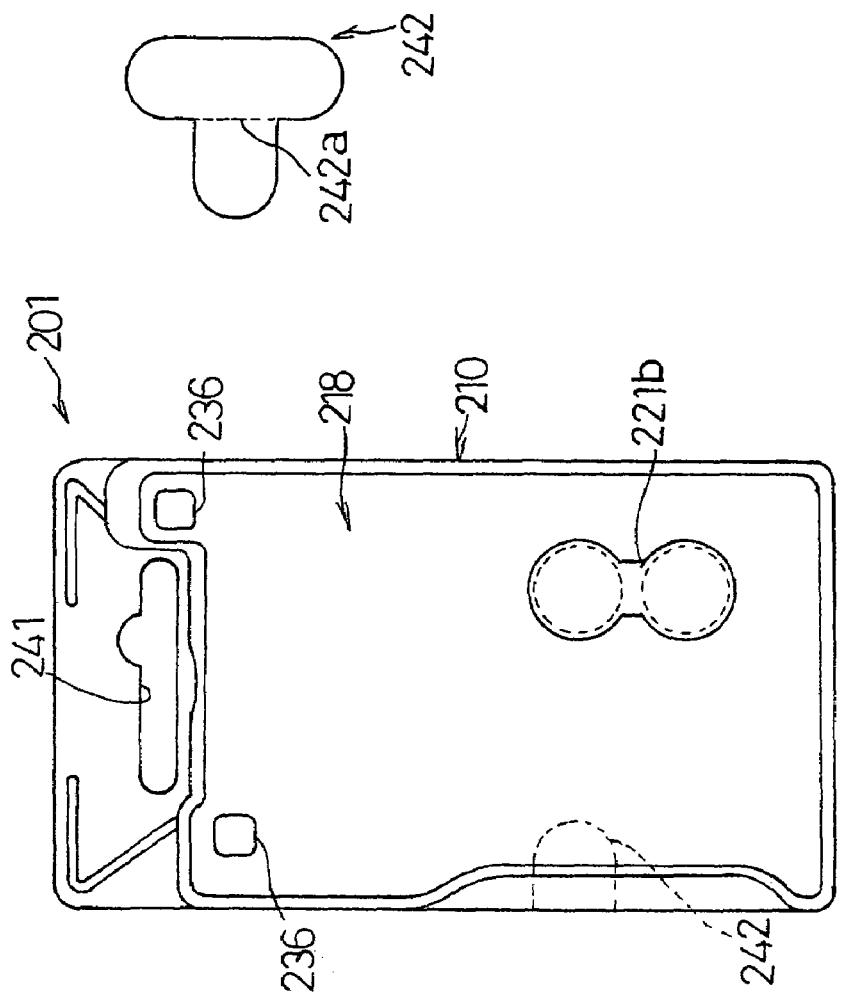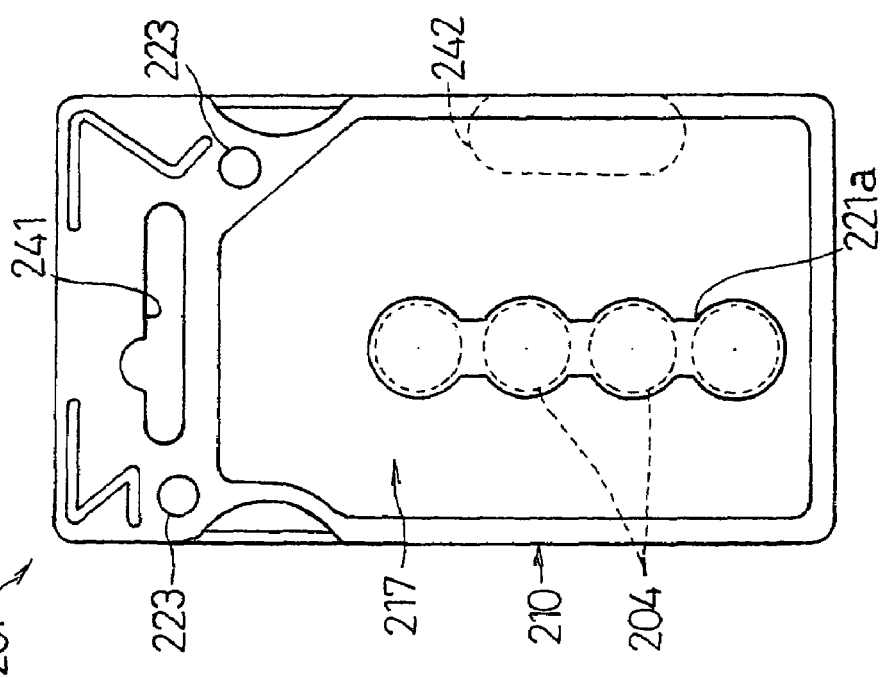

Fig.12A
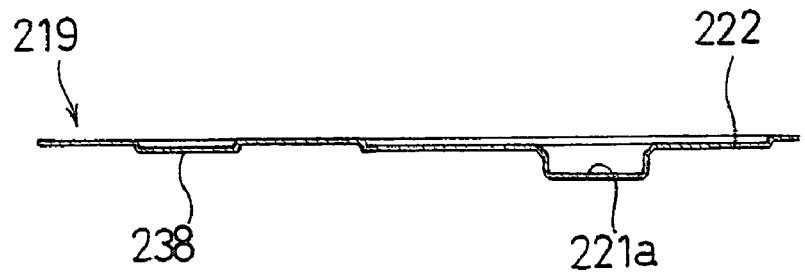
Fig.12B
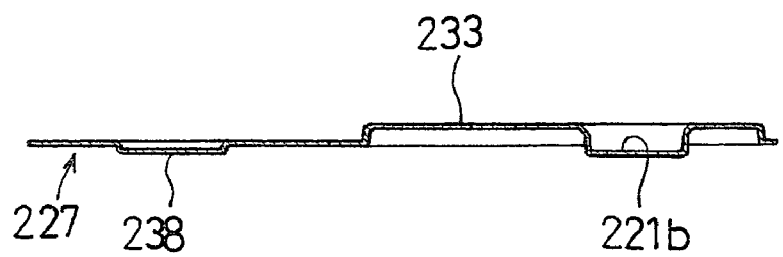
Fig.13A  Fig.13B
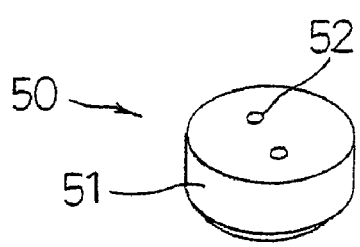
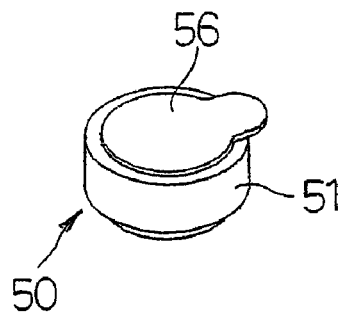

COMMODITY PACKAGING BODY

TECHNICAL FIELD

The present invention relates to an article packaging body for containing miniature articles to be sold or carried. The present invention is particularly suitably applicable to a zinc-air cell packaging body for containing a plurality of zinc-air cells to be sold or carried, and such zinc-air cell packaging body is constructed to contain a plurality of zinc-air cells having constitution for facilitating the peeling of a seal film sealing air holes and also facilitating the loading to devices such as hearing aids or the like, and to hold the zinc-air cells reliably when transported or carried.

BACKGROUND ART

As the mainstream of hearing aids develops from behind-the-ear type to smaller-sized in-the-ear type, the size of battery cells for such hearing aids is also required to be reduced accordingly. Also, since the hearing aids are used daily and continuously, the cells with longer life are desired. Button-type zinc-air cells are used as battery cells for hearing aids satisfying these requirements.

An zinc-air cell utilizes oxygen in the air as a positive electrode active material, as shown in FIG. 13A, thus a positive electrode can 51 of an zinc-air cell 50 is provided with air holes 52 for introducing air, and, as shown in FIG. 13B, these air holes 52 are sealed with a seal film 56 before use. When the zinc-air cell 50 is loaded and used in a device such as a hearing aid, the seal film 56 is removed to open the air holes 52 so that the zinc-air cell 50 starts its power generating function by using oxygen in the air introduced through the air holes 52 as the positive electrode active material.

Since a zinc-air cell employed for a minimal-sized device such as an in-the-ear type hearing aid is extremely small-sized, the replacement of such cell is very difficult. In particular, a zinc-air cell 50 involves a task to remove the seal film 56 for opening the air holes 52 before loading in a device, and this task of peeling off the small seal film 56 from the miniaturized zinc-air cell 50 is not easy. Considering the fact that principal users of hearing aids are elderly people, it will be particularly difficult for those elderly people, whose fingertip manipulation ability and eyesight have failed, to peel off the seal film 56 from the small zinc-air cell 50 and to load the small cell in a small hearing aid.

In order to facilitate the task of removing a seal film 56 and loading the zinc-air cell in a device, there has been developed a zinc-air cell 50, as shown in FIG. 14, in which one end of a seal film 53 formed to be long and hard is attached to a positive electrode can 51 to provide a sealing portion 53a, and a gripping portion 53b is provided in an extension from the sealing portion 53a (see U.S. Pat. No. 6,329,095). When the gripping portion 53 is gripped with fingertips, the zinc-air cell 50 becomes to be hung on the end of the seal film 53. In this configuration, as shown in FIG. 15, the zinc-air cell 50 can be placed in a cell receiving hole 55 of a device and the seal film 53 can be pulled up obliquely to remove the sealing portion 53a from the zinc-air cell 50, so that the tasks of loading the cell in the device and of removing the seal film can be accomplished.

The zinc-air cell 50, that can be provided for the positive electrode active material with oxygen in the atmosphere, is able to accommodate a larger quantity of a negative electrode active material, and therefore the cell capacity is approximately doubled and the service life is also approximately doubled compared to other types of cells of an identical size.

Nevertheless, as for devices such as hearing aids which are to be used continuously, if the service life of the cell ends and power shutoff occurs, this directly leads to inconvenience for the user. Therefore, it is a general practice to sell a plurality of zinc-air cells in a package so as to enable users to always have a spare cell ready for replacement, and it is a general practice of the users to carry such package of cells.

The zinc-air cell 50 shown in FIG. 14 is placed in a plurality in a packaging container 60 formed by resin molding (injection molding), and a zinc-air cell packaging body thus produced, containing the plurality of zinc-air cells 50, is sold or carried.

The packaging container 60 for zinc-air cells according to the above-mentioned conventional technique, which is formed by injection molding or the like, possesses enough durability to endure long-term use. On the other hand, zinc-air cells 50 contained therein are used for a device to operate continuously and hence required to be replaced frequently. Therefore, even though containing a plurality of zinc-air cells 50, the useful period of the packaging container 60 will come to an end in a relative short period of time. For example, an zinc-air cell 50 used for hearing aides is typically required to be replaced after about 10 days of use, though depending on the mode of use and the size. Accordingly, a packaging container 60 containing six zinc-air cells 50 will become useless in about two months from the purchase. The packaging container 60 is then disposed as a waste matter even though it is still usable, which constitutes a factor of the problems of increasing waste unnecessarily and failing to exploit resources.

Further, the zinc-air cell 50 is held at their seal films 53 by protrusions 61 formed in the packaging container 60, and housed in the mounted condition in the packaging container 60. Accordingly, if the zinc-air cell 50 is subjected to vibration or shock when transported or carried, the bonding strength with the seal film 53 might be decreased, or the zinc-air cell 50 might be removed or drop off. Such problem is caused by the fact that, when exposed to shock or vibration, the seal film 53 fixed to the packaging container 60 and the zinc-air cell 50 are subjected to stress in different directions and of different magnitudes, and therefore the seal film 53 and the zinc-air cell 50 move separately from each other. If the zinc-air cell 50 is held with protrusions 61, the seal film 53 might be moved or deformed by shock or vibration, and the seal film 53 might be removed or fall off. If the seal film 53 is removed or falls off, the electrolyte will evaporate and be scattered and lost through the air holes even if the zinc-air cell 50 is contained in the packaging container 60. If such condition lasts for a long period of time, the electrolyte will be completely lost and the zinc-air cell 50 will not be usable any more. Also, even if the result is not so serious as the seal film 53 is removed or fall off, the deterioration of the bonding condition of the seal film 53 to the zinc-air cell 50 will lead to deterioration of the sealing condition of the air holes and hence deterioration of the cell properties.

An object of the present invention is to provide an inexpensive article packaging body for containing a plurality of small-sized articles such as the above-mentioned zinc-air cells to be sold or carried, and for facilitating the handling of the articles.

Another object of the present invention is to provide an article packaging body that contains a plurality of zinc-air cells each having a seal film structure designed to facilitate the loading of the zinc-air cells in a device, so that the articles are sold or carried.

DISCLOSURE OF THE INVENTION

In order to achieve these objects, an article packaging body of the present invention formed from a sheet of hard material comprises an article containing plate part having a plurality of containing recesses for containing articles, a cover plate part being connected with the article containing plate part, and a gripping piece forming plate part being formed by extending from the article containing plate part and/or the cover plate part via a folding line, wherein a plurality of gripping pieces is formed in the gripping piece forming plate part so as to be separable individually and to hold an article at the tip end of each of the gripping pieces, the gripping piece forming plate part is folded onto the article containing plate part such that the articles are placed in the respective containing recesses, and the cover plate part is openably closed such that the gripping piece forming plate part is sandwiched between the cover plate part and the article containing plate part.

Further, in order to achieve the aforementioned objects, an article packaging body of the present invention formed from a sheet of hard material comprises an article containing plate part having a plurality of containing recesses for containing articles, a cover plate part being connected with the article containing plate part and having a plurality of containing recesses for containing articles, and gripping piece forming plate parts being formed by extending respectively from the article containing plate part and the cover plate part via a folding line, a plurality of gripping pieces is formed in the respective gripping piece forming plate parts so as to be separable individually and to hold an article at the tip end of each of the gripping pieces, the gripping piece forming plate parts are folded onto the article containing plate part such that the articles are placed in the respective containing recesses, and the cover plate part is openably closed such that the gripping piece forming plate parts are sandwiched between the cover plate part and the article containing plate part.

In the invention as described above, the article is a zinc-air cell, the zinc-air cell is held at the tip end of a gripping piece through a seal film consisting of a sealing portion removably attached to the zinc-air cell so as to close an air hole thereof and a fold-back portion formed by folding the edge of the sealing portion onto the sealing portion so as to be extended therefrom, and the fold-back portion is connected to the tip end of the gripping piece. By constructing in this manner, the present invention can provide an article packaging body optimal for containing zinc-air cells.

As the articles to be held at the tip ends of the gripping pieces of the articles packaging body, there may be exemplified button-type cells including zinc-air cells as mentioned in the above and watch cells (also called as coin cells), drug pills, fishhooks, sewing needles, screws, nails, miniature precision components, and so on. Such articles may also be directly attached to the tip ends of the gripping pieces with an adhesive or tackifier.

A synthetic resin such as PET may be used suitably as the sheet material. Particularly, it is ecologically desirable to use biodegradable plastics such as polylactic acids as the sheet material.

BRIEF DESCRIPTION OF THE DRAWINGS

FIGS. 1A to 1C show the constitution of a zinc-air cell packaging body according to a first embodiment of the present invention, FIG. 1A being a plan view of the front side, FIG. 1B being a plan view of the back side, and FIG. 1C being a plan view of a sealing tape;

FIGS. 9A to 9C show the constitution of a zinc-air cell packaging body according to a third embodiment of the present invention, FIG. 9A being a plan view of the front side, FIG. 9B being a plan view of the back side, and FIG. 9C being a plan view of a sealing tape;

FIG. 12A is a cross section taken along the line XIIA-XIIA and as viewed in the direction of the arrows of FIG. 11, and FIG. 12B is a cross section taken along the line XIIB-XIIB and as viewed in the direction of the arrows of FIG. 11;

FIGS. 13A to 13B are perspective views showing the constitution of a zinc-air cell according to a conventional technique;

BEST MODE FOR CARRYING OUT THE INVENTION

Figure 2:
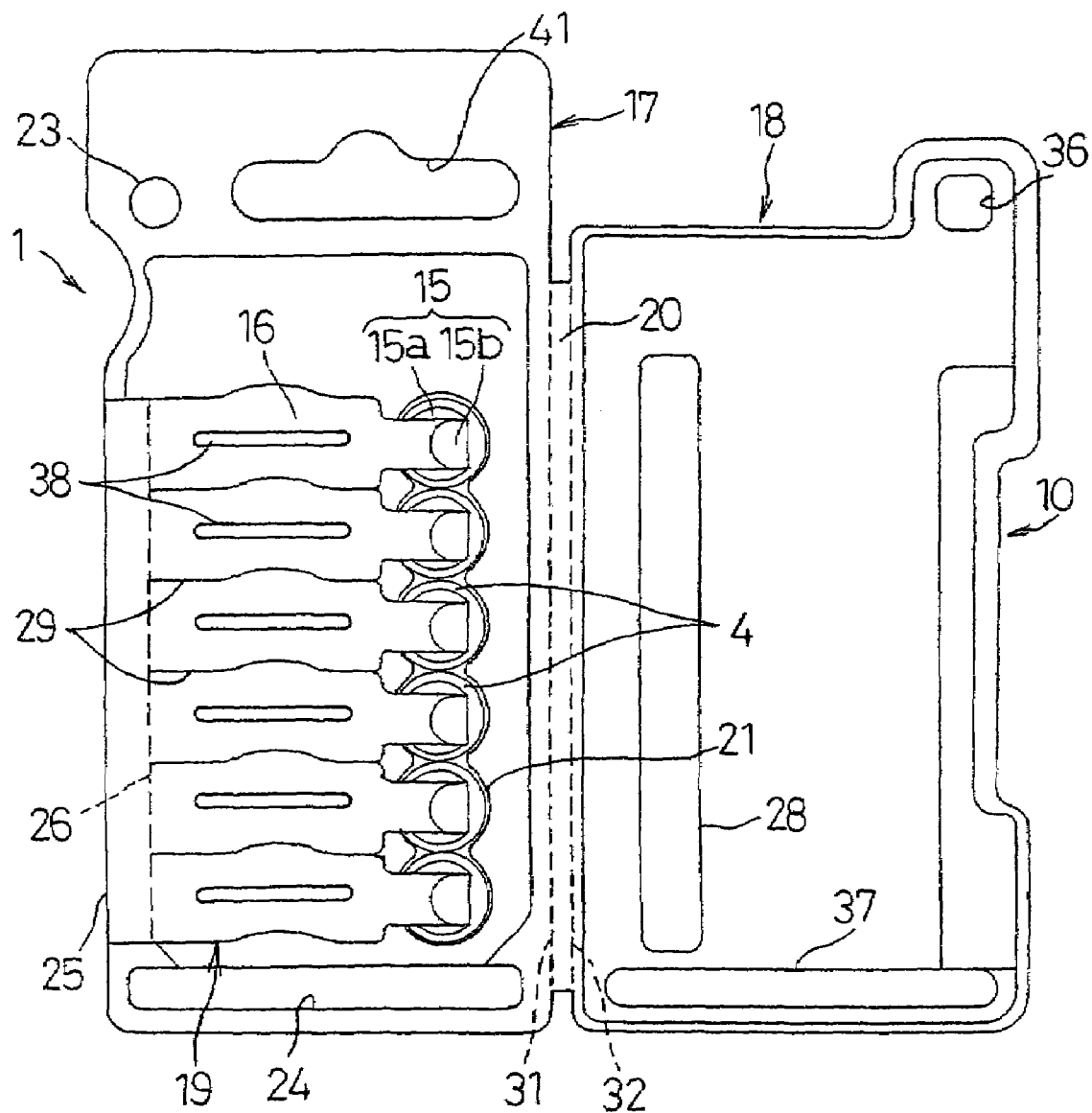
FIG. 2 is a plan view showing the state where the cover plate part of the zinc-air cell packaging body according to the first embodiment is open.

A first embodiment of the present invention as shown in FIGS. 1A to 5B relates to an article packaging body for containing zinc-air cells as the articles to be contained.

Hereinbelow, description will be made with reference to a zinc-air cell packaging body (article packaging body) 1 which contains a plurality of zinc-air cells (articles) 4 to be sold or carried. In this example, the zinc-air cell packaging body 1 containing six zinc-air cells 4 is sold as one package, and a user who has bought this package is enabled to have zinc-air cells ready for replacement by carrying the zinc-air cell packaging body 1.

FIGS. 1A to 1C shows the external appearance of the front and back sides of the zinc-air cell packaging body 1 according to the embodiment. A packaging body 10 is formed by performing thermoforming (vacuum forming and/or air-pressure forming) on a hard sheet, for example a transparent sheet of polyethylene terephthalate (hereinbelow, referred to as PET) so as to impart a convexoconcave shape as required, and is provided with an apertures and the outline which are formed by punching the sheet by press working. On the front side as shown in FIG. 1A, the part of a zinc-air cell containing recess (containing recess) 21 containing six cells 4 is left transparent so that it can be seen from the outside, while the other parts including the back side as shown in FIG. 1B are made opaque by making prints on both the front and backsides. The prints include a trade name, part number, care instructions, and so on, whose specific illustration is omitted in the drawings.

A hanging hole 41 is opened in the upper part of the packaging body 10 for enabling the hanging display, and the height dimension of the whole body is designed so as to be within the limit allowed by a hanging display stand. When displayed for sale, a cell containing plate (article containing plate part) 17 located on the front side and a cover plate (cover plate part) 18 located on the back side are fastened together by a sealing sticker 42 which is generally called "virgin sticker," as shown in FIG. 1C so that the zinc-air cell packaging body 1 is not opened.

A user who has purchased this zinc-air cell packaging body 1 separates the cover plate 18 from the cell containing plate 17 by breaking the sealing sticker 42 along a perforation line 42*a* formed at the center thereof. In order to open the cover plate 18, the cell containing plate 17 is held with one hand, and the cover plate 18 is pushed open with the other hand's thumb put on the cover plate 18 from a cut-out portion 30 formed in the cell containing plate 17 as a fingerhold, whereby the engagement between these plates is released and the cover plate 18 is opened into the condition where the inside face of the cell containing plate 17 is laid open as shown in FIG. 2.

FIG. 2 shows the configuration where the cover plate 18 of the zinc-air cell packaging body 1 has been opened, and six zinc-air cells 4 are contained in the cell containing recess 21 such that they are aligned in a longitudinal direction of the cell containing plate 17. The seal film 15 attached to each of the zinc-air cells 4 has a fold-back piece (fold-back portion) 15*b*, to which the tip end of each of gripping pieces 16, which are formed by separating, along separation lines 29, a gripping piece forming plate (gripping piece forming plate part) 19 formed by being extended from one longitudinal side of the cell containing plate 17 and folded inwards, is joined.

Figure 5A:
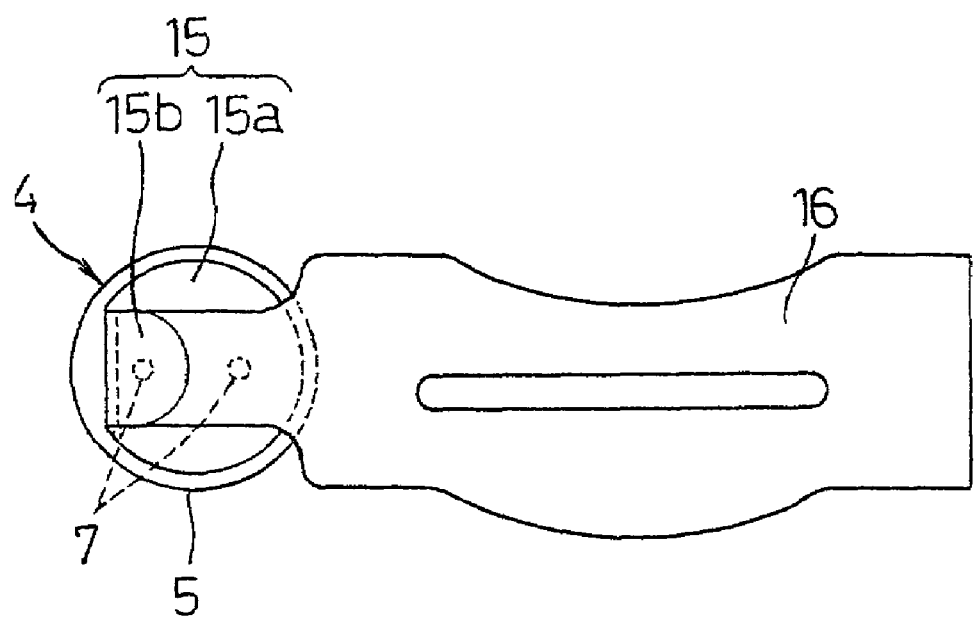
FIGS. 5A and 5B show the constitution of the zinc-air cell according to the first embodiment, FIG. 5A being a plan view and FIG. 5B being a side view.
Figure 5B:
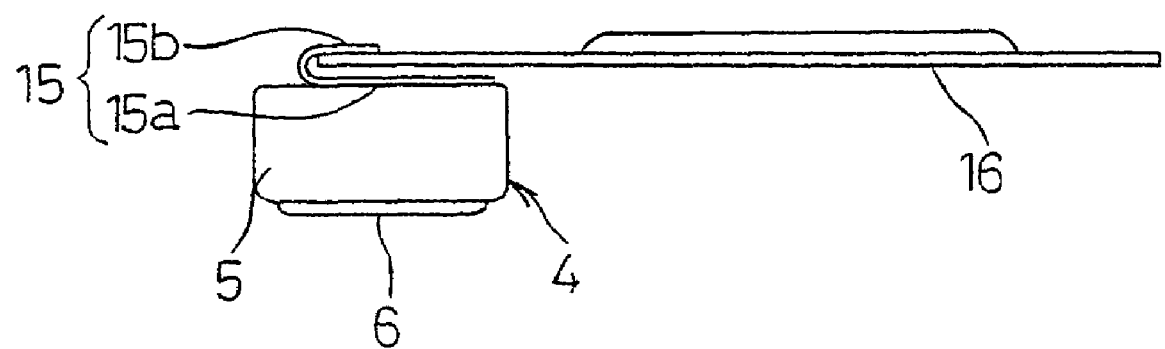

The zinc-air cell 4 is constructed as shown in FIGS. 5A and 5B such that a power generating element using zinc as a negative electrode active material is contained in a positive electrode can 5 formed in a closed-end cylindrical shape, a sealing plate 6 serving as a negative electrode is placed on the opening of the positive electrode can 5 with a gasket interposed therebetween, and the open end of the positive electrode can 5 is sealed by crimping. Air holes 7 are formed in the bottom of the positive electrode can 5 for introducing oxygen as a positive electrode active material. In an unused condition, these air holes 7 are sealed with a seal film 15 attached thereto, and the seal film 15 is removed from the positive electrode can 5 before use so that the zinc-air cell 4 starts power generation, using oxygen in the air introduced through the air holes 7 as the positive electrode active material. The seal film 15 is formed by applying an adhesive on a required surface of a film of polyethylene or polypropylene, and a gripping piece 16 to be described later is formed integrally with the packaging body 10.

As for the procedures for mounting the zinc-air cell 4 constructed as described above in a device such as a hearing aid, since the gripping piece 16 is formed of a hard sheet, all the movements, including gripping the gripping piece 16 with fingertips to hold the zinc-air cell 4, placing the zinc-air cell 4 in the cell receiving portion of the device, and pulling the gripping piece 16, are performed easily. Further, when the gripping piece 16 is pulled, since the fold-back piece (fold-back portion) 15*b* is folded back from the sealing face (sealing portion) 15*a*, the movement of removing the sealing face 15*a* from the positive electrode can 5 is performed smoothly and the risk of pulling out the zinc-air cell 4 from the device when removing the sealing face 15*a* is eliminated.

The tip end of the respective gripping pieces 16 is joined to the each fold-back piece 15*a* of the seal films 15 attached to the respective zinc-air cells 4. These gripping pieces 16 are formed by separating individually, along the separation lines 29, the gripping piece forming plate (gripping piece forming portion) 19 that is formed by being extended from one longitudinal side of the cell containing plate 17 and folded inwards.

In order to take out a single zinc-air cell 4 from the zinc-air cell packaging body 1, a gripping piece 16 is gripped with fingertips placed at the portion of the separation line 29 where the line is curved in a circular arc, so that the single gripping piece 16 is raised up and the cell 4 is taken out of the cell containing recess 21. The gripping piece 16 is then cut off along the perforations of the cutoff line 26. The zinc-air cells 4 are taken out one by one in this manner.

Figure 3:
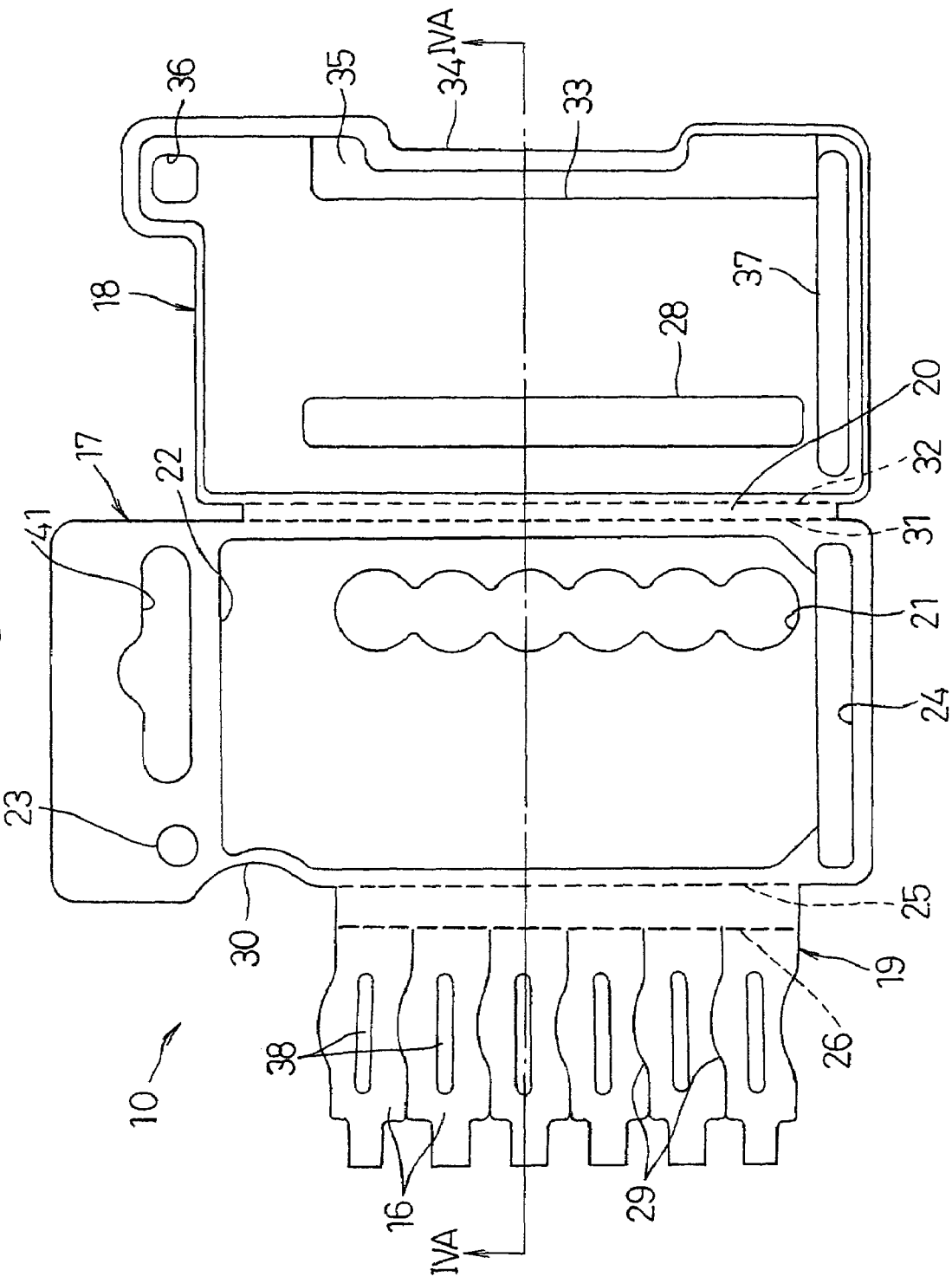
FIG. 3 is a plan view showing the packaging body according to the first embodiment in the developed configuration.
Figure 4:
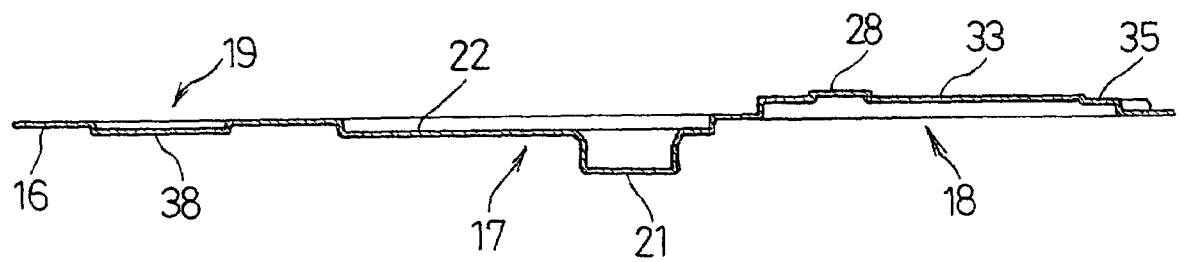
FIG. 4 is a cross section taken along the line IVA-IVA and as viewed in the direction of the arrows of FIG. 3 showing the packaging body.

FIG. 3 shows the packaging body 10 in the developed configuration. As shown in FIG. 4 that is the cross section taken along the line IVA-IVA and as viewed in the direction of arrows, a convexo-concave shape is imparted to the packaging body 10 by thermoforming a sheet of PET, and the outline and an aperture are formed by punching the sheet by means of press working while at the same time folding lines and cutoff lines are formed.

As shown in FIGS. 3 and 4, the cell containing plate 17 at the center is provided with a shallow reinforcing recess 22 for preventing deformation of the plate, and cell containing recesses 21 for containing six zinc-air cells 4 arranged in a line are formed in the reinforcing recess 22 so as to have a depth corresponding to the height of the zinc-air cells 4. Further, in the top part of the cell containing plate 17, a hanging hole 41 and an engagement projection 23 to be engaged with the cover plate 18 are formed, and in the lower part, a positioning recess 24 is formed for being engaged with the cover plate 18 for positioning the same. As shown in the cross sectional view of FIG. 4, the cell containing recess 21 has its falling edge formed into an inclined plane, so that even if an zinc-air cell 4 hung on the tip end of the gripping piece 16 through a soft seal film 15 is tilted with respect to the gripping piece 16, the zinc-air cell is properly placed in the cell containing recess 21 with the tilt being corrected.

The gripping piece forming plate 19, that is formed by being extended from one longitudinal side of the cell containing plate 17 via a folding line 25 formed by perforations, has six gripping pieces 16 formed by separating the gripping piece forming plate 19 along separation lines 29 each provided with a circular-arc shape for making it easy to pick up the gripping pieces one by one with fingertips. The gripping pieces 16 are formed so as to be cut off easily along a cutoff line 26 formed by perforations and, when assembled, as shown in FIG. 2, are folded onto the cell containing plate 17 from the folding line 25. Further, each of the gripping pieces 16 is provided with a reinforcing rib 38 for reinforcing the gripping piece 16 so that the gripping piece 16 will not be bent when the zinc-air cell 4 is hung on the tip end through the seal film 15.

A narrow hinge plane (hinge plane part) 20 is formed on the other longitudinal side of the cell containing plate 17 via a first folding line 31, and a cover plate 18 is formed to extend from the hinge plane 20 via a second folding line 32. The first folding line 31 is formed such that the linking parts between the elongated perforations forming the first folding line 31 are shorter, whereas the second folding line 32 is formed such that the linking parts between the elongated perforations forming the second folding line 32 are longer than those of the first folding line 31. By constructing the perforations of the first and second folding lines 31 and 32 in this manner, the first folding line 31 which is easier to fold is allowed to function preferentially as the hinge when the cover plate 18 is opened/closed with respect to the cell containing plate 17, and the hinge plane 20 is first folded into a substantially right angle along the first folding line 31. Thereafter, the hinge plane 20 is then folded into a substantially right angle along the second folding line 32 so that the cover plate 18 is closed on the cell containing plate 17. Therefore, the hinge plane 20 is allowed to make substantially right angles with the cell containing plate 17 and the cover plate 18 without causing deformation to the packaging body 10, and excellent appearance is imparted to the packaging body 10.

As shown in FIGS. 3 and 4, the cover plate 18 is provided with a reinforcing projection 33 that is formed for preventing deformation of the cover plate 18 so as to cover almost the whole area thereof and to project low from the plane of the drawing surface in FIG. 3. The cover plate 18 is also provided, at its portion corresponding to the fold-back part of the gripping piece forming plate 19, with a step portion 35 where the height of projection is decreased to receive the thickness of the gripping piece forming plate 19, and is further provided, at the edge thereof, with a fingerhold cut-out portion 34 for making it easy for a user to put his/her finger on the cell containing plate 17 when opening the cover plate 18 from the cell containing plate 17. On the reinforcing projection 33, there are provided a cell pressing projection 28 for holding down the cells 4 accommodated in the cell containing recesses 21, an engagement recess 36 to be engaged with the above-mentioned engagement projection 23, and a positioning projection 37 to be engaged with the above-mentioned positioning recess 24.

The packaging body 10 is formed in the configuration as shown in FIGS. 3 and 4 by thermoforming and press working a sheet of PET having prints thereon. The configuration of the packaging body 10 as shown in FIG. 2 is then obtained by aligning and placing zinc-air cells 4 each having a seal film 15 attached thereto within the cell containing recesses 21, folding the gripping piece forming plate 19 onto the cell containing plate 17 from the folding line 25, and joining the foldback pieces 15b of the seal films 15 to the tip ends of the gripping pieces 16. Further, when the cover plate 18 is folded onto the cell containing plate 17 along the first and second folding lines 31 and 32, the positioning projection 37 formed into an oblong shape enters into the positioning recess 24 formed into a substantially rectangular shape gradually in the longitudinal direction. The longitudinal alignment is thus achieved between the cell containing plate 17 and the cover plate 18, and when the cell containing plate 17 and the cover plate 18 are pressed to each other in the compressing direction, the positioning projection 37 is fitted in the positioning recess 24. Further, when the engagement projection 23 is fitted in the engagement recess 36 by pressing the upper part of the packaging body 10 in the compressing direction, the configuration as shown in FIGS. 1A and 1B where the cover plate 18 is closed with the gripping piece forming plate 19 placed on the cell containing plate 17 is obtained.

Since the engagement between the cell containing plate 17 and the cover plate 18 is accomplished by fitting the circular or oblong projection into the approximately rectangular recess, the projection is engaged with the recess with a plurality of points of the projection in point contact with the peripheral surface of the recess, and the deterioration of the engagement security is suppressed. Accordingly, even if the cover plate 18 is opened and closed many times until all six zinc-air cells 4 have been consumed, the engagement function of the packaging body 10, which is simply constructed with a sheet material, will not deteriorate.

In the embodiment described above, although six zinc-air cells 4 are packaged in one package, the number of zinc-air cells is not limited to six. For example, for the case of zinc-air cells 4 having a larger diameter, a smaller number of such zinc-air cells 4 may be packaged so that the increase of the height dimension of the zinc-air cell packaging body 1 is suppressed to conform the restriction on height dimension of packaging bodies to be sold in hanging display, and the portability is not impaired.

Figure 6:
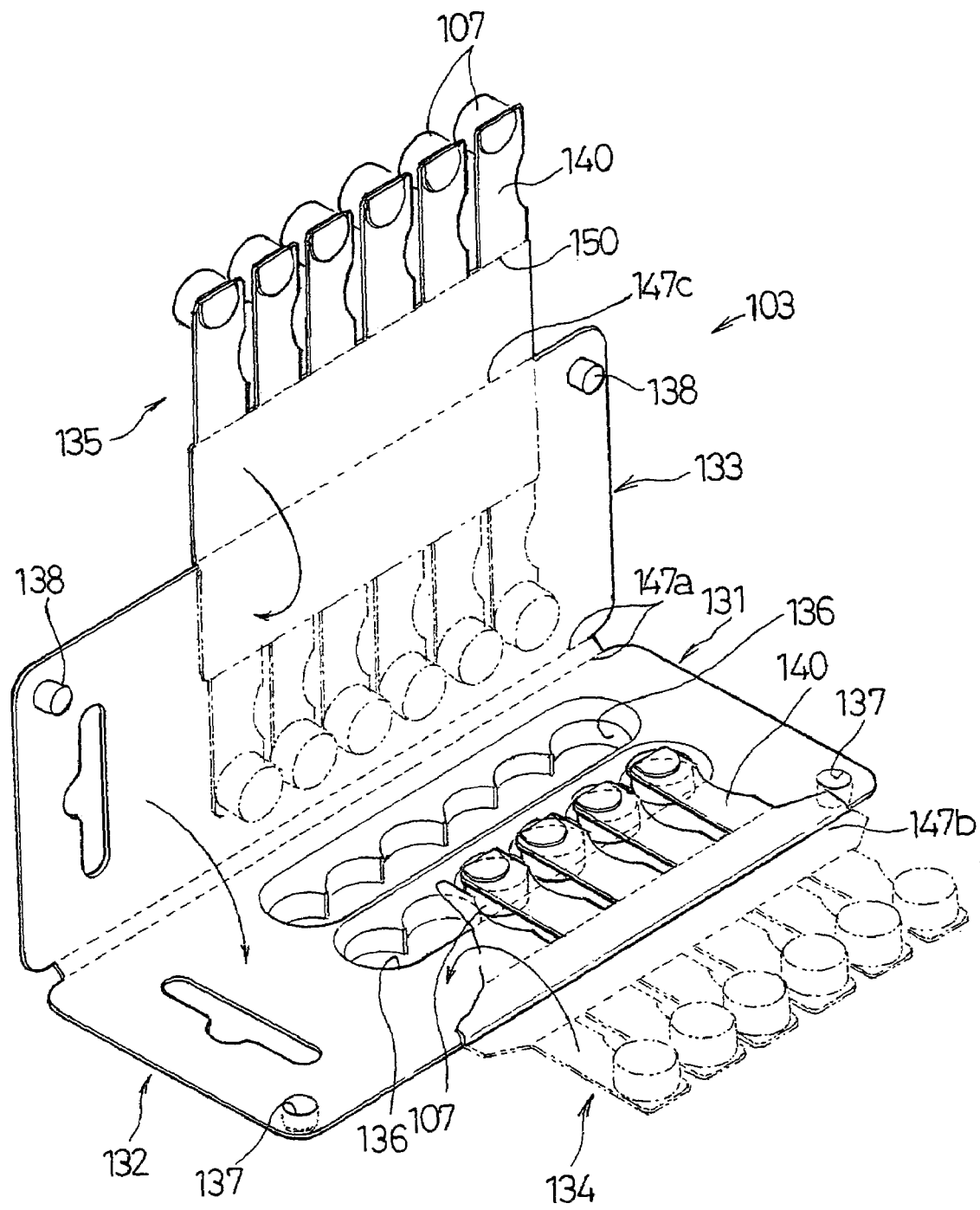
FIG. 6 is a perspective view showing the constitution of an article packaging body according a second embodiment of the present invention.
Figure 7:
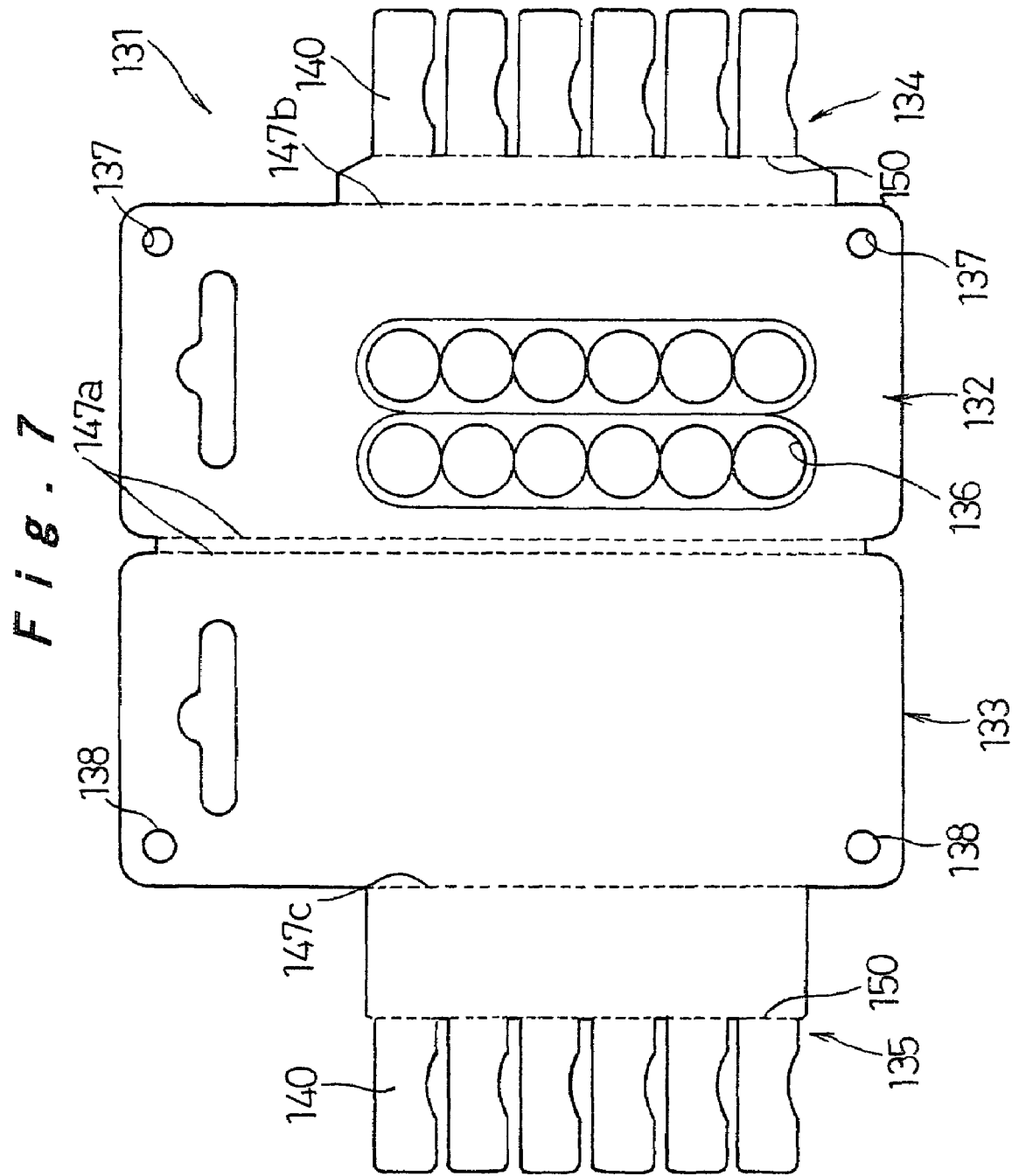
FIG. 7 is a plan view showing the constitution of the packaging body according to the second embodiment.
Figure 8:
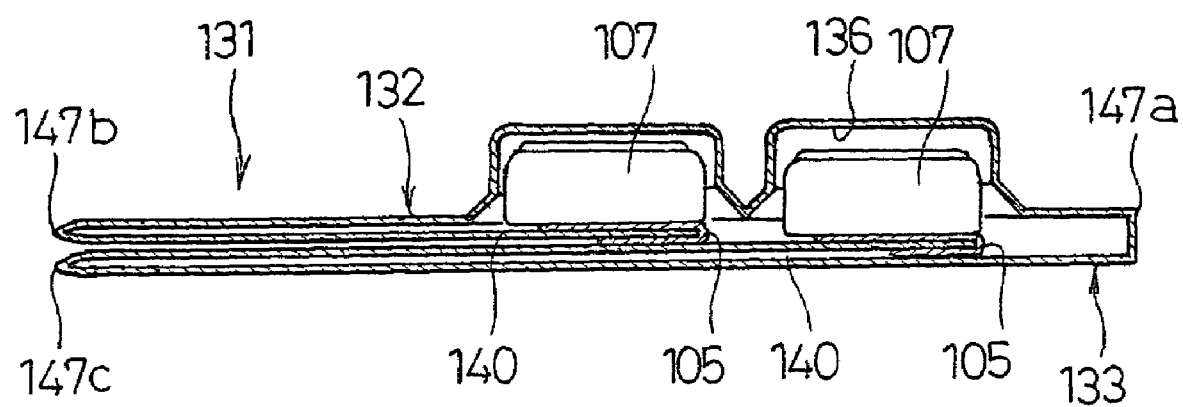
FIG. 8 is a cross section of the article packaging body according to the second embodiment.

FIGS. 6 to 8 show a second embodiment of the present invention, which relates to an article packaging body for containing zinc-air cells. The main difference from the first embodiment is that a gripping piece forming plate is also provided to the cover plate by being extended therefrom, while the other constructional features are similar to those of the first embodiment.

FIG. 6 shows configurations of a zinc-air cell packaging body (article packaging body) 103 according to the second embodiment, which is constructed to pack twelve zinc-air cells (articles) 107 into one package in a packaging body 131.

As shown in FIG. 7, the packaging body 131 is provided with a cell containing plate (article containing plate part) 132, a cover plate (cover plate part) 133, a first gripping piece forming plate (first gripping piece forming plate part) 134, and a second gripping piece forming plate (second gripping piece forming plate part) 135, by thermoforming and press working a sheet of PET. The cell containing plate 132 is provided with cell containing recesses (containing recesses) 136 for containing twelve zinc-air cells 107 arranged in two lines, and the zinc-air cells 107 attached via a seal film 105 to the respective tip ends of six gripping pieces 140 formed in the first gripping piece forming plate 134 and the zinc-air cells 107 attached via a seal film 105 to the respective tip ends of six gripping pieces 140 formed in the second gripping piece forming plate 135 are contained in these cell containing recesses 136.

As shown in FIG. 6, the first gripping piece forming plate 134 is folded along a folding line 147b onto the cell containing plate 132, the second gripping piece forming plate 135 is folded along a folding line 147c onto the cover plate 133, the cover plate 133 is folded along a folding line 147a onto the cell containing plate 132, and two engagement projections 138 and 138 formed in the cover plate 133 are fitted in two engagement recesses 137 and 137 formed in cell containing plate 132. Thereby, twelve zinc-air cells 107 are contained in the packaging body 131 as shown in FIG. 8.

In order to take out a zinc-air cell 107, the engagement between the engagement recess 137 and the engagement projection 138 is released to open the cover plate 133 as shown in FIG. 6, and any desired gripping piece 140 is cut off along a cutoff line 150. In this manner, the zinc-air cell 107 is taken out in the condition attached to the tip end of the gripping piece 140 via the seal film 105. If the zinc-air cell 107 is so much miniaturized that it is difficult to handle even with fingertips, the zinc-air cell 107 is held by gripping the gripping piece 140 and is placed in the cell receiving portion of a device as it is attached to the gripping piece 140. The gripping piece 140 is then pulled to remove the seal film 105 from the zinc-air cell 107.

FIGS. 9A to 12B show a third embodiment of the present invention, which relates to an article packaging body for containing zinc-air cells. The main difference from the first embodiment is that containing recesses are formed in each of an article containing part and cover plate part, and a gripping piece forming plate part is also provided to each of them by being extended therefrom, while the other constructional features are similar to those of the first embodiment.

FIGS. 9A to 9C show the external appearance of the front and back sides of a zinc-air cell packaging body (article packaging body) 201 according to the third embodiment. A packaging body 210 is formed by performing thermoforming (vacuum forming and/or air-pressure forming) on a transparent sheet of polyethylene terephthalate (hereinbelow, referred to as PET) so as to impart a convexo-concave shape as required, and is provided with an aperture and the outline which are formed by punching the sheet by press working. On the cell containing plate (article containing plate part) 217 side as shown in FIG. 9A, the part of zinc-air cell containing recesses (containing recesses) 221a containing four zinc-air cells (articles) 204 is left transparent so that it can be seen from the outside, while the other parts are made opaque by making prints. Further, the cover plate (cover plate part) 218 as shown in FIG. 9B covers the cell containing plate 217 such that the cover plate 218 can be opened and closed freely, and the cover plate 218 is also provided with cell containing recesses (containing recesses) 221b for containing zinc-air cells 204. Similarly to the cell containing recesses 221a of the cell containing plate, the part of the cell containing recesses 221b of the cover plate 218 is also left transparent, while the other parts are made opaque by making prints. The prints include a trade name, part number, care instructions, and so on, whose specific illustration is omitted in the drawings.

A hanging hole 241 is opened in the upper part of the packaging body 210 for enabling the hanging display, and the height dimension of the whole body is designed so as to be within the limit allowed by a hanging display stand. When displayed for sale, the cell containing plate 217 and the cover plate 218 are fastened together by a sealing sticker 242 which is generally called "virgin sticker" provided with perforations 242a, so that the zinc-air cell packaging body 201 is not opened. The method of opening the zinc-air cell packaging body 201 having the sealing sticker 242 applied thereto is similar to the method as described in relation to the first embodiment.

Figure 10:
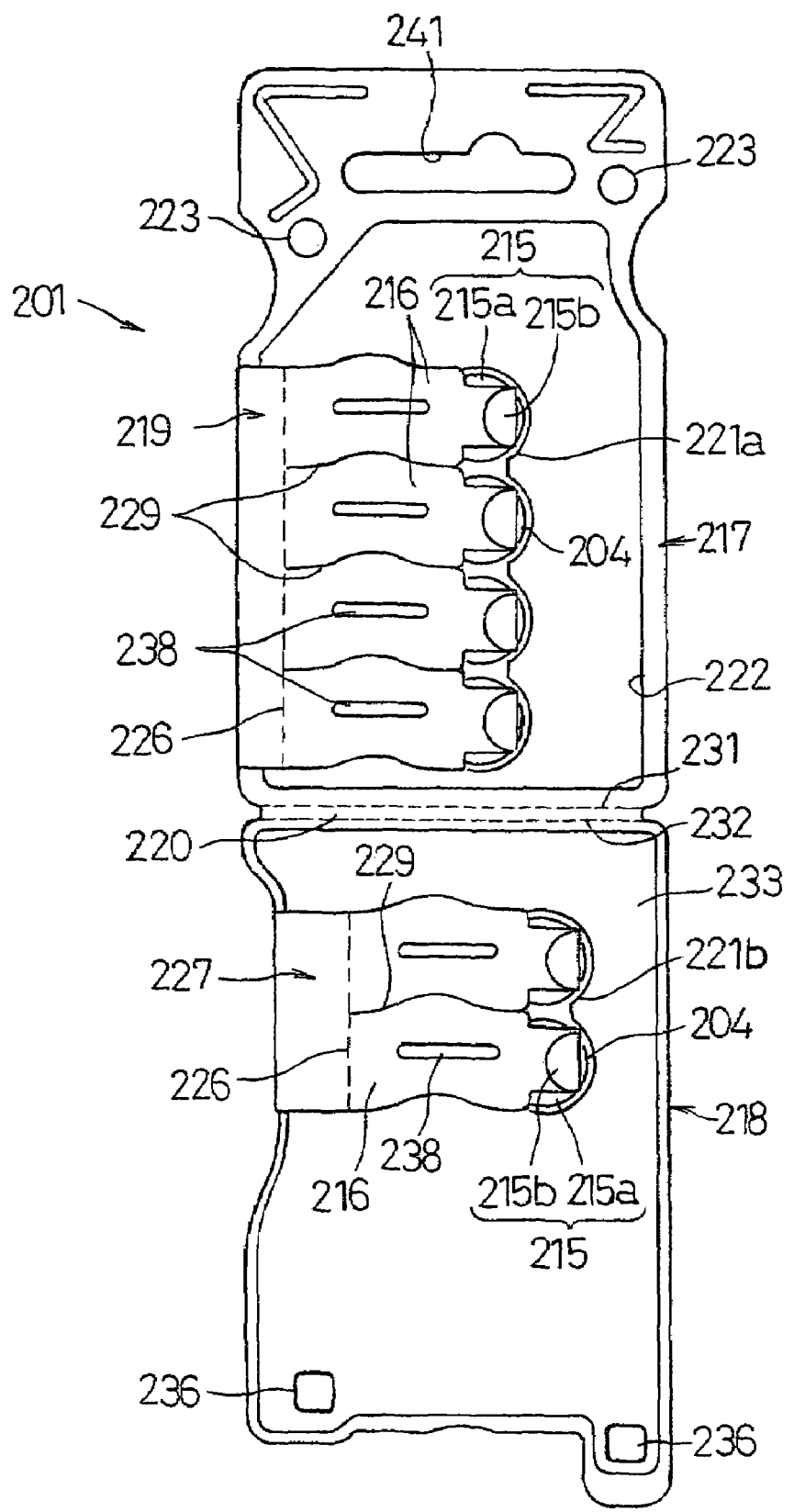
FIG. 10 is a plan view showing the state where the cover plate part of the zinc-air cell packaging body according to the third embodiment is open.

FIG. 10 shows the configuration of the zinc-air cell packaging body 201 where the cover plate 218 is opened. Four zinc-air cells 204 aligned in the longitudinal directions of the cell containing plate 217 and two zinc-air cells 204 aligned in the longitudinal directions of the cover plate 218 are contained in the cell containing recesses 221a and 221b, respectively. The seal film 215 attached to each of the zinc-air cells 204 has a fold-back piece (fold-back portion) 215b, to which the tip end of each of gripping pieces 216, which are formed by separating, along separation lines 229, gripping piece forming plates (gripping piece forming plate parts) 219 and 227 extended respectively from one longitudinal side of the cell containing plate 217 and the cover plate 218 and folded inwards, is joined. The seal film 215 is similar to that of the first embodiment and consists of a sealing face 215a and the above-mentioned fold-back piece 215b.

In order to take out a single zinc-air cell 204 from the zinc-air cell packaging body 201, a gripping piece 216 is gripped with fingertips placed at the portion of the separation line 229 where the line is curved in a circular arc, so that the single gripping piece 216 is raised up and the cell 204 is taken out of the cell containing recess 221a or 221b. The gripping piece 216 is then cut off along the perforations of the cutoff line 226. The zinc-air cells 204 are taken out one by one in this manner.

Figure 11:
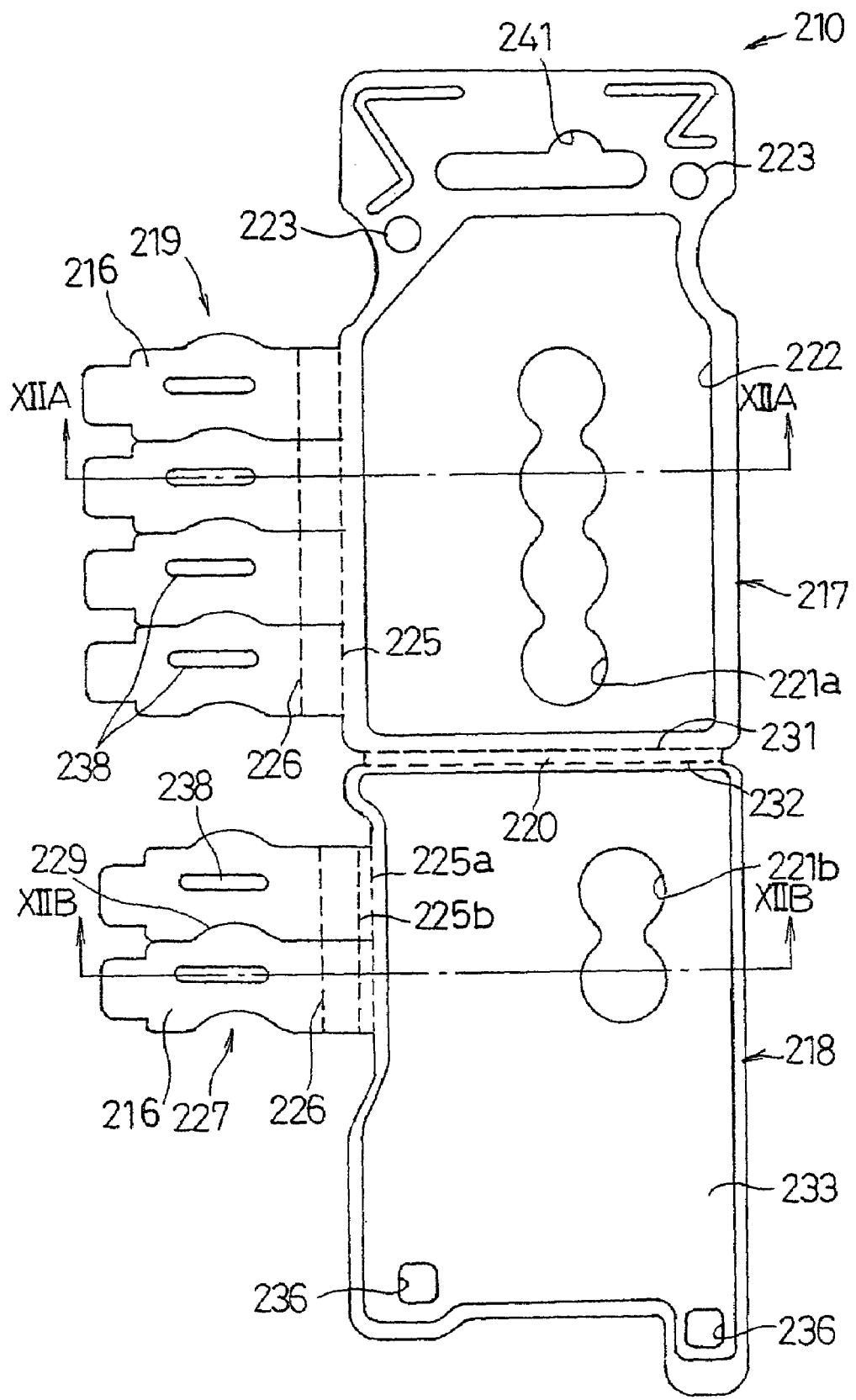
FIG. 11 is a plan view showing the packaging body according to the third embodiment in the developed configuration.
Figure 14:
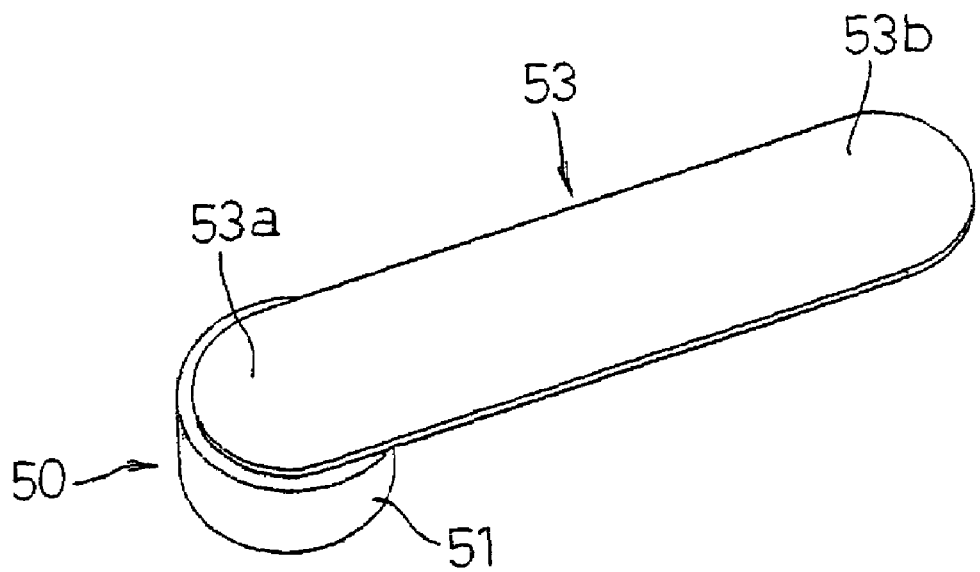
FIG. 14 is a perspective view showing the constitution of a zinc-air cell according to a conventional technique.
Figure 15:
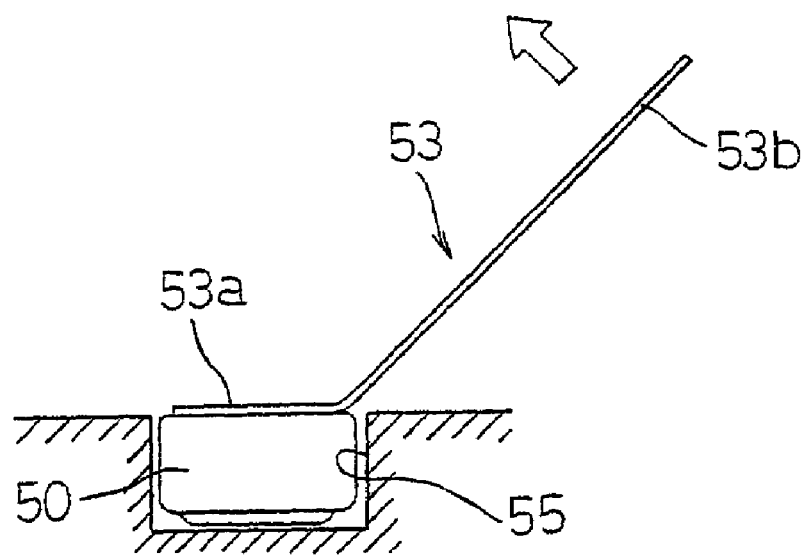
FIG. 15 is an illustration for illustrating how a zinc-air cell is mounted in a cell receiving hole according to the conventional technique.
Figure 16:
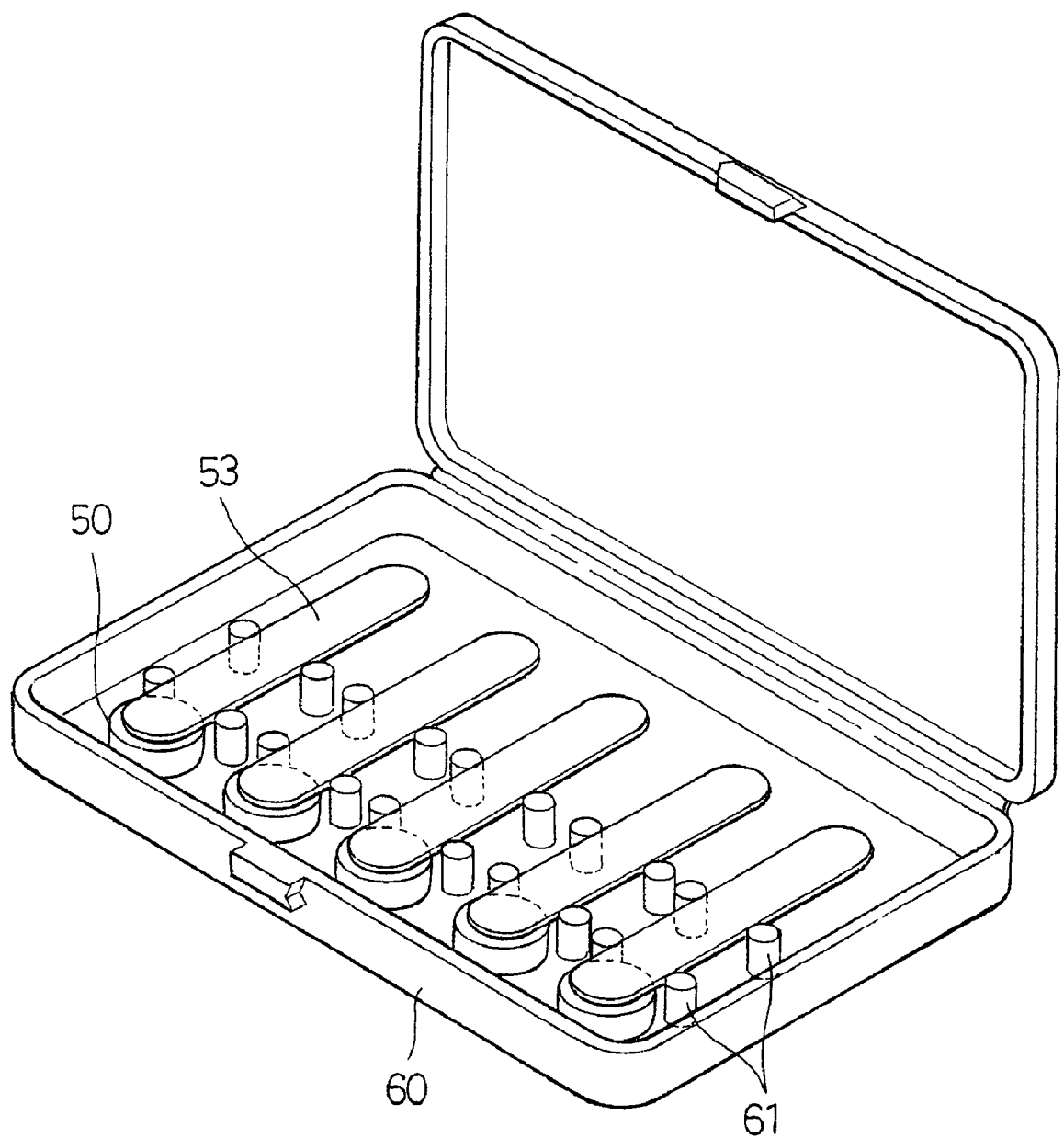
FIG. 16 is a perspective view showing the constitution of a packaging body according to the conventional technique in which the above-mentioned zinc-air cell is contained in a plurality.

FIG. 11 shows the packaging body 210 in the developed configuration. As shown in FIG. 12A that is the cross section taken along the line XIIA-XIIA and as viewed in the direction of arrows and FIG. 12B that is the cross section taken along the line XIIB-XIIB and as viewed in the direction of arrows, a convexoconcave shape is imparted by thermoforming a sheet of PET, and the outline and an aperture are formed by punching the sheet by means of press working while at the same time folding lines and cutoff lines are formed.

As shown in FIGS. 11, 12A and 12B, the cell containing plate 217 is provided with a shallow reinforcing recess 222 for preventing deformation of the plate, and cell containing recesses 221a for containing four cells 204 arranged in a line are formed in the reinforcing recess 222 so as to have a depth corresponding to the height of the zinc-air cells 204. Further, in the upper part of the cell containing plate 17, a hanging hole 241 and an engagement projection 223 to be engaged with the cover plate 218 are formed. As shown in the cross sectional view of FIG. 12A, the cell containing recess 221a has its falling edge formed into an inclined plane, so that even if an zinc-air cell 204 hung on the tip end of a gripping piece 216 by a soft seal film 215 is tilted with respect to the gripping piece 216, the zinc-air cell is properly placed in the cell containing recess 221a with the tilt being corrected.

The gripping piece forming plate 219, that is formed by being extended from one longitudinal side of the cell containing plate 217 via a folding line 225 formed by perforations, is provided with four gripping pieces 216 formed by separating the gripping piece forming plate 219 along the separation lines 229 each provided with a circular-arc shape for making it easy to pick up the gripping pieces one by one with fingertips. The gripping pieces 216 are formed so as to be cut off easily along the cutoff line 226 formed by perforations and, when assembled, as shown in FIG. 10, are folded onto the cell containing plate 217 from the folding line 225. Further, each of the gripping pieces 216 is provided with a reinforcing rib 238 for reinforcing the gripping piece 216 so that the gripping piece 216 will not be bent when the zinc-air cell 204 is hung on the tip end through the seal film 215.

A narrow hinge plane (hinge plane portion) 220 is formed on the lower part of the article containing plate 217 via a first folding line 231, and a cover plate 218 is formed to extend from the hinge plane 220 via a second folding line 232. The first folding line 231 is formed such that the linking parts between the elongated perforations forming the first folding line 231 are shorter, whereas the second folding line 232 is formed such that the linking parts between the elongated perforations forming the second folding line 232 are longer than those of the first folding line 231. By constructing the perforations of the first and second folding lines 231 and 232 in this manner, the first folding line 231 which is easier to fold is allowed to function preferentially as the hinge when the cover plate 218 is opened/closed with respect to the cell containing plate 217, and the hinge plane 220 is first folded into a substantially right angle along the first folding line 231. Thereafter, the hinge plane 220 is then folded into a substantially right angle along the second folding line 232 to close the cover plate 218 on the cell containing plate 217. Therefore, the hinge plane 220 makes substantially right angles with the cell containing plate 217 and the cover plate 218 without causing deformation to the packaging body 210, and excellent appearance is obtained.

The cover plate 218 is provided with a reinforcing projection 233 that is formed so as to cover almost the whole area thereof and to project low from the plane of the drawing surface, for preventing deformation of the cover plate 218 and for pressing the zinc-air cells 204 contained in the cell containing recesses 221a. Within this reinforcing projection 233, there are provided cell containing recesses 221b for accommodating two zinc-air cells 204 so as to be depressed in the opposite direction to the depressing direction of the cell containing recesses 221a in the article containing plate part 217, and to a depth corresponding to the height of the zinc-air cells 204. In the lower part, there is provided an engagement recess 236 to be engaged with the engagement projection 223 provided in the cell containing plate 217 for keeping the cover plate 218 closed on the cell containing plate 217. As shown in the cross sectional view of FIG. 12B, the cell containing recess 221b, like the cell containing recess 221a formed in the cell containing plate 217, has its falling edge formed into an inclined plane, so that even if an zinc-air cell 204 hung on the tip end of a gripping piece 216 through a soft seal film 215 is tilted with respect to the gripping piece 216, the zinc-air cell is properly placed in the cell containing recess 221b with the tilt being corrected.

Further, a gripping piece forming plate 227 is formed on one longitudinal side of the cover plate 218 such that it is extended therefrom via two folding lines 225a and 225b which are formed by perforations and separated by a distance corresponding the height of the aforementioned reinforcing projection 233. The gripping piece forming plate 227 is provided, like its counterpart in the cell containing plate 217, with two gripping pieces 216 formed by separating the gripping piece forming plate 227 along the separation lines 229 each provided with a circular-arc shape for making it easy to pick up the gripping pieces one by one with fingertips. The gripping pieces 216 are formed so as to be cut off easily along the cutoff line 226 formed by perforations and, when assembled, as shown in FIG. 11, are folded onto the cover plate 218 from the folding lines 225a and 225b. Further, as shown in FIG. 10, each of the gripping pieces 216 is provided with a reinforcing rib 238 for reinforcing the gripping piece 216 so that the gripping piece 216 will not be bent when the zinc-air cell 204 is hung on the tip end through the seal film 215.

The packaging body 210 is formed in the configuration as shown in FIGS. 11, 12A and 12B by thermoforming and press working a sheet of PET having prints thereon. The configuration of the packaging body 210 as shown in FIG. 10 is then obtained by aligning and placing zinc-air cells 204 each having a seal film 215 attached thereto within the cell containing recesses 221a and 221b, folding the gripping piece forming plate 219 from the folding line 225 onto the cell containing plate 217, joining the fold-back pieces 215b of the seal films 215 to the tip ends of the gripping pieces 216, folding the gripping piece forming plate 227 from the folding lines 225a and 225b onto the cover plate 218, and joining the fold-back pieces 215b of the seal films 215 to the tip ends of the gripping pieces 216.

Then the configuration shown in FIGS. 9A and 9B where the cell containing plate 217 is closed with the cover plate 218 is obtained, by starting from the configuration shown in FIG. 10, placing the cover plate 218 onto the cell containing plate 217 by folding the same along the first and second folding lines 231 and 232, and pressing the cell containing plate 217 and the cover plate 218 in the compressing direction to cause the engagement projection 223 of the cell containing plate 217 to be fitted in the engagement recess 236.

Since the engagement between the cell containing plate 217 and the cover plate 218 is accomplished by fitting the circular or oblong projection into the approximately rectangular recess, the projection is engaged with the recess with a plurality of points of the projection in point contact with the peripheral surface of the recess, the deterioration of the engagement security is suppressed. Accordingly, even if the cover plate 218 is opened and closed many times until all six zinc-air cells 204 have been consumed, the engagement function of the packaging body 210, which is simply constructed with a sheet material, will not deteriorate.

INDUSTRIAL APPLICABILITY

As described in the above, the article packaging body according to the present invention is formed easily from a single sheet of hard material, for example, by performing thermoforming and press working on a hard sheet material, and thus formed into a structure that is inexpensive and is still durable enough to be used for a limited time period until a plurality of contained articles have been consumed. Therefore, the article packaging body of the invention is suitable for eliminating the waste of using expensive packaging bodies such as injection molded ones that are usable semi-permanently. Additionally, since a part of the packaging body constitutes a plurality of gripping pieces holding a plurality of articles respectively at their tip ends, one of these articles is taken out for use from the packaging body in the condition hung on the tip end of the hard gripping piece by cutting off the gripping piece along the cutoff line. Therefore, the article is handled easily even if the article is so miniaturized that it is difficult to handle with fingertips.

In particular, when the present invention is applied to a packaging body for zinc-air cells, the zinc-air cells contained in the packaging body are held by the containing recesses and gripping pieces so that they will not be moved by vibration or shock. The gripping pieces are particularly suitable for preventing the zinc-air cells from being moved by vibration or shock because not only they hold the respective zinc-air cells at their tip ends but also they are formed integrally with the cell containing plate part. Further, since a part of the packaging body constitutes a plurality of gripping pieces, the tip ends of which are each joined to an end of a seal film attached to each of a plurality of zinc-air cells, one of the zinc-air cells is taken out for use from the packaging body by cutting off the gripping piece along the cutoff line in the condition where the zinc-air cell is hung on the tip end of the hard gripping piece, and then the seal film that is folded back and joined to the gripping piece is removed easily by placing the zinc-air cell, while holding the same with the gripping piece, into a cell receiving portion of a device and pulling off the gripping piece.

The invention claimed is:

1. An article packaging body comprising:
an article containing plate having a plurality of recesses configured to receive articles;
a cover plate connected to the article containing plate; and
a gripping plate which extends from either one of the article containing plate and the cover plate, the gripping plate being provided with a plurality of grips configured to hold corresponding articles at a distal end, the grips configured to be individually separable from each other, the gripping plate configured to be folded onto the article containing plate such that the articles are received in corresponding recesses,
wherein the articles comprise a zinc-air cell, the zinc-air cell being held at a distal end of a corresponding grip via a seal film having a seal which is removably attached to the zinc-air cell so as to close an air hole provided on the zinc-air cell and a fold-back portion provided by folding an edge of the seal onto the seal such that the fold-back portion extends from the seal, and the fold-back portion being connected to the distal end of the corresponding grip.

2. The article packaging body according to claim 1, wherein the article packaging body comprises a sheet of hard material.

3. The article packaging body according to claim 1, wherein the article packaging body comprises a hard synthetic resin sheet material.

4. The article packaging body according to claim 1, wherein the article packaging body comprises a hard biodegradable plastic sheet material.

5. The article packaging body according to claim 1, further comprising a planar hinge having folding lines, the hinge connecting the article containing plate to the cover plate, and the article containing plate configured to be folded onto the cover plate via the folding lines.

6. The article packaging body according to claim 1, further comprising a planar hinge having a soft bending perforation line and a hard bending perforation line, the soft bending perforation line connecting the planar hinge to the article containing plate and the hard bending perforation line connecting the planar hinge to the cover plate, the soft bending perforation line being more flexible than the hard bending perforation line.

7. The article packaging body according to claim 1, wherein the article containing plate and the cover plate are provided with reinforcing concave and convex portions, respectively.

8. The article packaging body according to claim 1, wherein the plurality of grips are each provided with a reinforcing rib extending in a longitudinal direction.

9. The article packaging body according to claim 1, wherein the gripping plate comprises separation lines provided with a circular-arc shape, the separation lines defining the plurality of grips.

10. The article packaging body according to claim 1, further comprising an engagement having an engagement recess provided on one of the containing plate and the cover plate, and a projection provided on the other of the containing plate and the cover plate, wherein the projection is configured to be received in the engagement recess such that the article containing plane and cover plate engage each other.

11. The article packaging body according to claim 10, wherein the engagement recess has a generally rectangular shape and the projection has a circular shape.

12. The article packaging body according to claim 1, further comprising an aperture provided at an edge of the article packaging body, the aperture being configured to hang the article packaging body on a hanging display.

13. The article packaging body according to claim 1, wherein the article comprises a button-type cell.

14. The article packaging body according to claim 1, wherein the plurality of grips have corresponding seals which include corresponding fold-back portions, the seals each covering a corresponding recess.

15. The article packaging body according to claim 1, further comprising folding lines configured to allow folding of the article packaging body such that the gripping plate is positioned between the cover plate and the article containing plate.

16. The article packaging body according to claim 1, further comprising a folding line which connects the gripping plate to one of the cover plate and the article containing plate, wherein the folding line is configured to allow the gripping plate to be folded along the folding line and onto the article containing plate.

17. The article packaging body according to claim 1, wherein each of the plurality of grips is provided with a reinforcing rib which reinforces a corresponding grip.

18. An article packaging body comprising:
an article containing plate having a plurality of recesses configured to receive corresponding articles;
a cover plate connected to the article containing plate, the cover plate having a plurality of recesses configured to receive corresponding articles; and
gripping plates extending from the corresponding article containing plate and corresponding cover plate, each gripping plate being provided with a plurality of grips configured to hold corresponding articles at a distal end, the grips configured to be individually separable from each other, and the gripping plates configured to be folded onto the corresponding article containing plate and corresponding cover plate such that the articles are received in corresponding recesses of the article containing plate and cover plate,
wherein the articles comprise a zinc-air cell, the zinc-air cell being held at a distal end of a corresponding grip via a seal film having a seal which is removably attached to the zinc-air cell so as to close an air hole provided on the zinc-air cell and a fold-back portion provided by folding an edge of the seal onto the seal such that the fold-back portion extends from the seal, and the fold-back portion being connected to the distal end of the corresponding grip.

19. The article packaging body according to claim 18, wherein the article packaging body comprises a sheet of hard material.

20. The article packaging body according to claim 8, wherein the article packaging body comprises a hard synthetic resin sheet material.

21. The article packaging body according to claim 18, wherein the article packaging body comprises a hard biodegradable plastic sheet material.

22. The article packaging body according to claim 18, further comprising a planar hinge having folding lines, the hinge connecting the article containing plate to the cover plate, and the article containing plate configured to be folded onto the cover plate via the folding lines.

23. The article packaging body according to claim 18, further comprising a planar hinge having a soft bending perforation line and a hard bending perforation line, the soft bending perforation line connecting the planar hinge to the article containing plate and the hard bending perforation line connecting the planar hinge to the cover plate, the soft bending perforation line being more flexible than the hard bending perforation line.

24. The article packaging body according to claim 18, wherein the article containing plate and the cover plate are provided with reinforcing concave and convex portions, respectively.

25. The article packaging body according to claim 18, wherein the plurality of grips are each provided with a reinforcing rib extending in a longitudinal direction.

26. The article packaging body according to claim 18, wherein the gripping plate comprises separation lines provided with a circular-arc shape, the separation lines defining the plurality of grips.

27. The article packaging body according to claim 18, further comprising an engagement having an engagement recess provided on one of the containing plate and the cover plate, and a projection provided on the other of the containing plate and the cover plate, wherein the projection is configured to be received in the engagement recess such that the article containing plane and cover plate engage each other.

28. The article packaging body according to claim 27, wherein the engagement recess has a generally rectangular shape and the projection has a circular shape.

29. The article packaging body according to claim 18, further comprising an aperture provided at an edge of the article packaging body, the aperture being configured to hang the article packaging body on a hanging display.

30. The article packaging body according to claim 18, wherein the article comprises a button-type cell.

31. The article packaging body according to claim 18, wherein the plurality of grips have corresponding seals which include corresponding fold-back portions, the seals each covering a corresponding recess.

32. The article packaging body according to claim 18, further comprising folding lines configured to allow folding of the article packaging body such that the gripping plate is positioned between the cover plate and the article containing plate.

33. The article packaging body according to claim 18, further comprising folding lines which connect the gripping plates to the corresponding cover plate and the corresponding article containing plate, wherein the folding lines are configured to allow the gripping plates to be folded along the folding lines and onto the corresponding cover plate and the corresponding article containing plate.

34. The article packaging body according to claim 18, wherein each of the plurality of grips is provided with a reinforcing rib which reinforces a corresponding grip.

* * * * *